US007011211B1

(12) United States Patent  
Jen

(10) Patent No.: US 7,011,211 B1
(45) Date of Patent: Mar. 14, 2006

(54) STORAGE CONTAINER FOR AN APPENDAGE OF A COMPACT DISC

(75) Inventor: Lin-Yung Jen, Taichung (TW)

(73) Assignee: Halin Enterprise Co., Ltd., Taichung (TW)

( * ) Notice: Subject to any disclaimer, the term of this patent is extended or adjusted under 35 U.S.C. 154(b) by 0 days.

(21) Appl. No.: 11/052,568

(22) Filed: Feb. 7, 2005

(51) Int. Cl.
B65D 85/57 (2006.01)
(52) U.S. Cl. .................................. 206/308.1; 206/309
(58) Field of Classification Search ............. 206/308.1, 206/309, 310–313, 493
See application file for complete search history.

(56) References Cited

U.S. PATENT DOCUMENTS 4,488,645 A * 12/1984 Yamaguchi .............. 206/307.1
D378,333 S * 3/1997 Anderson .................... D6/632
5,839,575 A * 11/1998 Blanco ........................ 206/232
D433,266 S * 11/2000 Peterson et al. ............. D6/634
6,783,000 B1 * 8/2004 Price et al. .............. 206/308.1
6,837,370 B1 * 1/2005 Shindo et al. ........... 206/308.1

* cited by examiner

Primary Examiner—Shian T. Luong
(74) Attorney, Agent, or Firm—Charles E. Baxley

(57) ABSTRACT

A storage container for an appendage of a compact disc comprises: a foldable board; a tray bonded to the foldable board, a recess formed on the tray, and a receiving cavity form at a bottom of the recess, at a bottom surface of the receiving cavity being formed a retaining structure for retaining compact disc; wherein a plurality of positioning portions are provided around peripheral sidewall of the recess, and a space is defined between the each of the positioning portions and the bottom surface of the recess, so that a appendage is received in the recess and are confined in the space by the positioning portions.

2 Claims, 7 Drawing Sheets

STORAGE CONTAINER FOR AN APPENDAGE OF A COMPACT DISC

BACKGROUND OF THE INVENTION

1. Field of the Invention

The present invention relates to a storage container for compact disc, and more particularly to a storage container for an appendage of a compact disc.

2. Description of the Prior Arts

Compact discs (CD) are becoming increasingly popular nowadays, and the compact discs (such as music CD, instructional CD, and the like) are commonly attached with appendage (such as words of song, specification, and the like). To prevent the reading and recording surfaces from being scratched, the compact discs are always stored in a storage container.

Referring to FIG. 1, which shows a conventional storage container which can accommodate three piece of CD at a time and consists of a foldable board 10 and trays 11, and the trays 11 are an integrally formed plastic structure. A recess 12 is formed on each of the trays 11, and a positioning structure 13 is formed in the center of the recess 12 for positioning CD in the recess 12. Around the periphery of the recess 12 are arranged a plurality of fingergrip cavities 15 for the facilitating grasping and removal of the CD 14, and the bottom surfaces of the respective cavities 15 of the trays 11 are bonded with the surface of the foldable board 10. The appendage 16 is inserted in a space between the respective trays 11 after the trays 11 are folded to form a storage container. However, this conventional storage container still has some defects that need to be improved:

First, if the user fails to notice the appendage 16 when opening the storage container, this will cause a likelihood of the appendage 16 falling on the ground and getting dirty or damaged.

Second, since only the fingergrip cavities 15 of the trays 11 are bonded with the foldable board 10, the connections between trays 11 and the foldable board 10 are likely to be broken after long time of use.

Referring to FIG. 2, which shows another type of CD storage container that has a plastic film 17 hot-pressed on the surface of the foldable board 10 so as to form a pocket for accommodation of the appendage 16, however, this CD storage container requires an additional hot pressing process and it will increase the production cost.

The present invention has arisen to mitigate and/or obviate the afore-described disadvantages.

SUMMARY OF THE INVENTION

The primary objective of the present invention is to provide a storage container for an appendage of a compact disc, wherein a recess is formed in the tray before the receiving cavity is shaped, so that the CD can be retained in the receiving cavity, furthermore, at peripheral sidewalls of the recess are arranged positioning portions, so that a appendage is received in the recess and are confined in the space by the positioning portions.

The secondary objective of the present invention is to provide a storage container for an appendage of a compact disc, besides bonding the bottom surface of the fingergrip cavities to the foldable board, the end surface of the respective projecting columns is also bonded with the foldable board for strengthening the connection between the tray and the foldable board, thus lengthening the service life of the storage container.

Yet another objective of the present invention is to provide a storage container for an appendage of a compact disc, wherein the tray is a unitary plastic structure, so that the positioning portions and the recess can be made in a single molding process, therefore, the production cost is relatively saved.

a storage container for an appendage of a compact disc provided in accordance with the present invention comprises:

a foldable board which can be folded to half;

a tray bonded to the foldable board, a recess formed on the tray, and a receiving cavity form at a bottom of the recess, at a bottom surface of the receiving cavity being formed a retaining structure for retaining compact disc; wherein a plurality of positioning portions are provided around peripheral sidewall of the recess, and a space is defined between the each of the positioning portions and the bottom surface of the recess, so that a appendage is received in the recess and are confined in the space by the positioning portions.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

Figure 1:
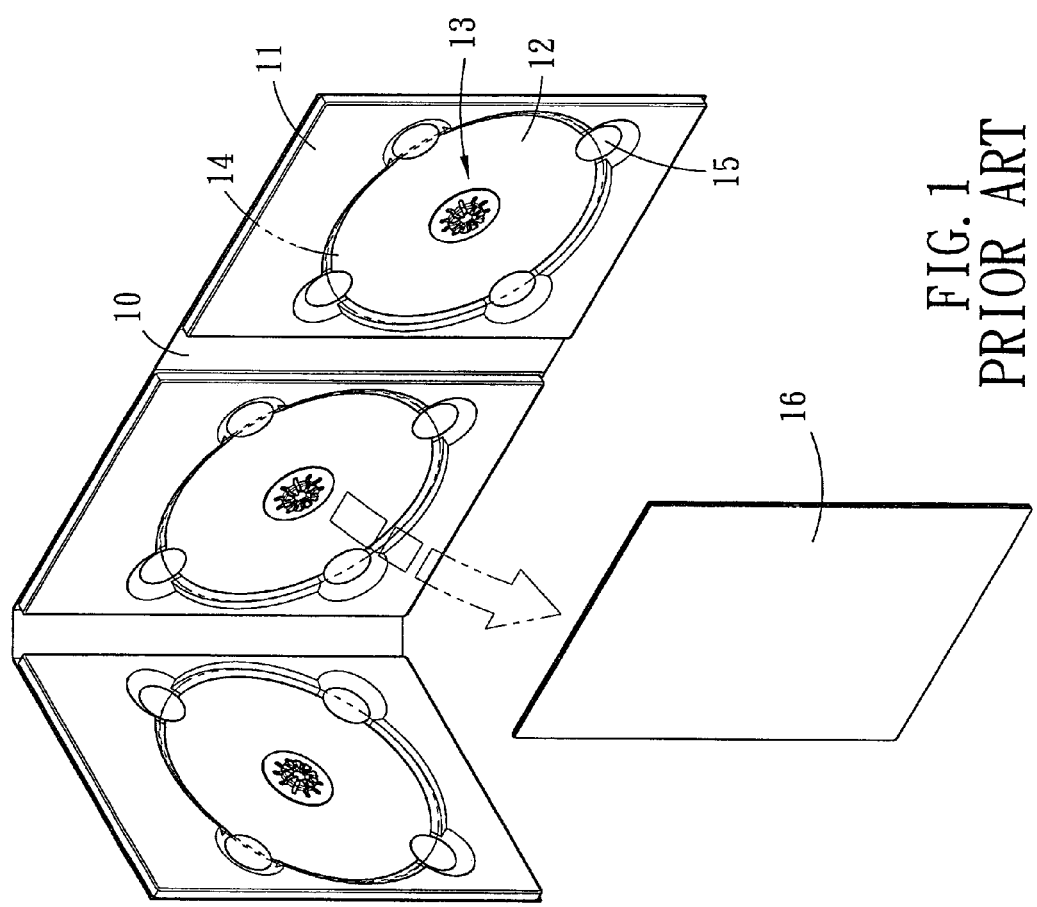
FIG. 1 is a perspective view of a conventional storage container for compact disc.
Figure 2:
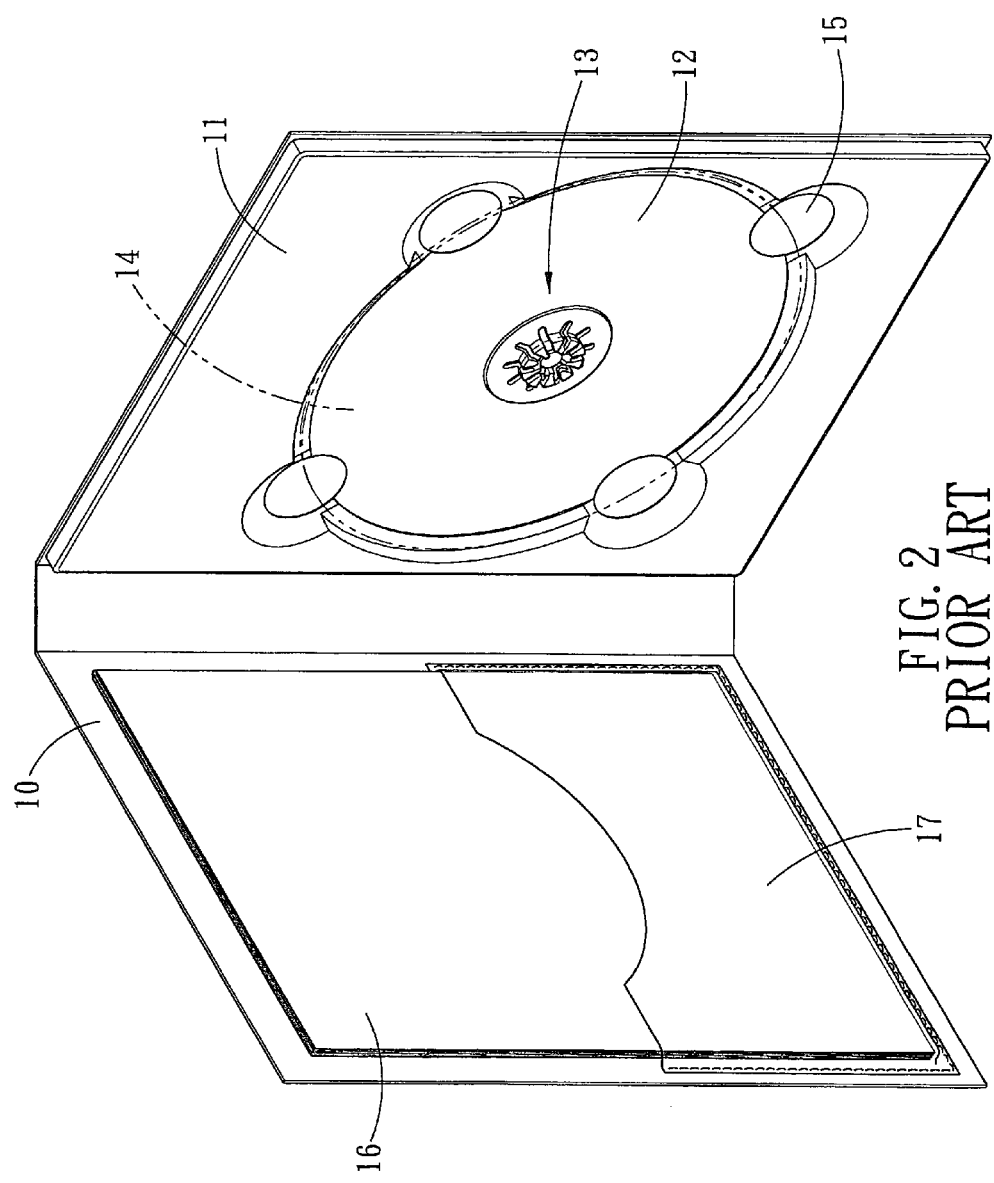
FIG. 2 is a perspective view of another conventional storage container for compact disc.
Figure 3:
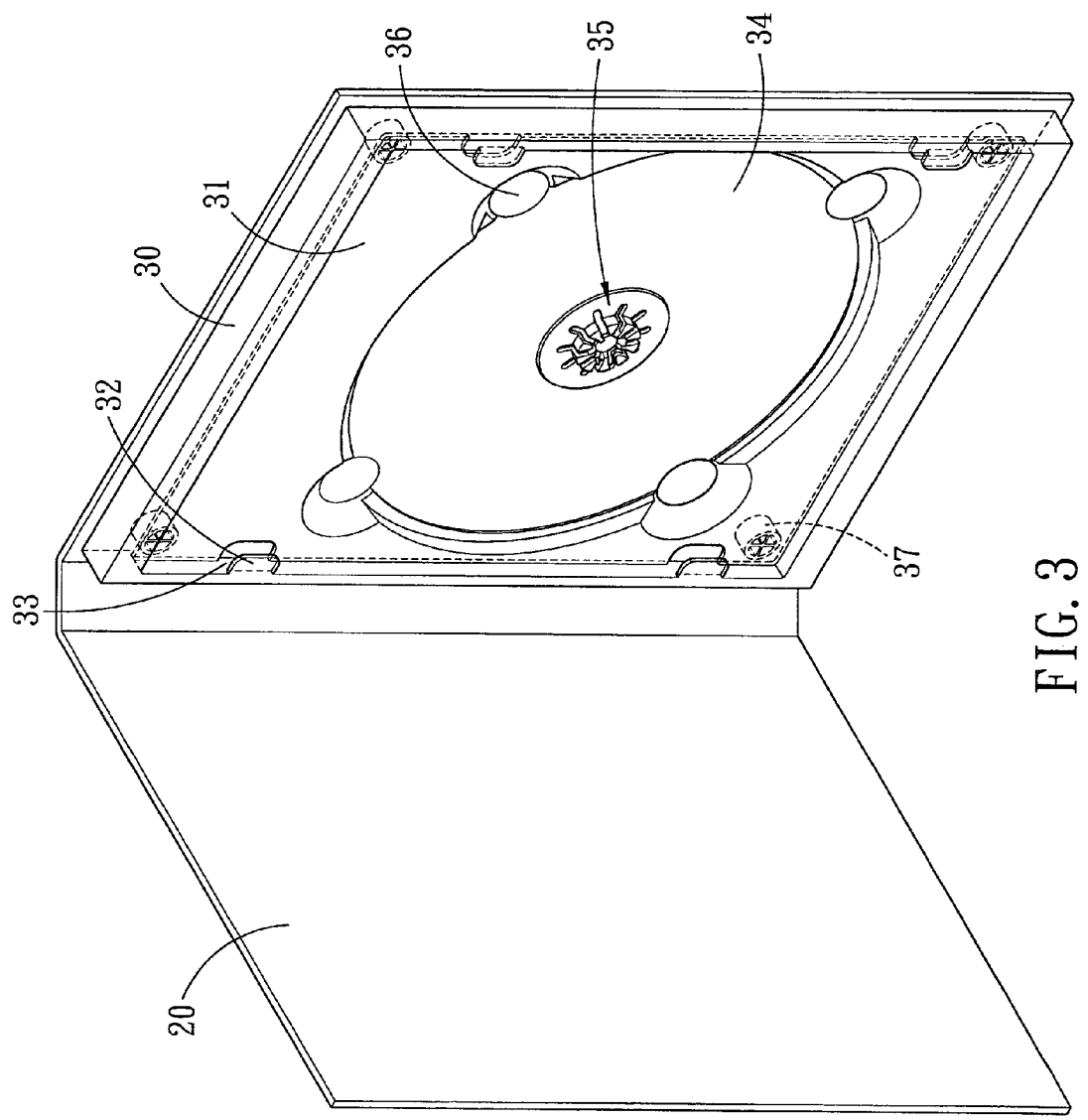
FIG. 3 is a perspective view of a storage container for an appendage of a compact disc in accordance with the present invention.

Referring to FIG. 3, a storage container for an appendage of a compact disc in accordance with a preferred embodiment of the present invention is shown and comprises a foldable board 20 and a tray 30.

The foldable board 20 can be folded in half.

The tray 30 is a unitary plastic structure and is provided on its surface with a recess 31, at two opposite sides of the recess 31 are arranged two positioning portions 32, and a space 33 is defined between the positioning portion 32 and the bottom of the recess 31. At the bottom of the recess 31 is defined a receiving cavity 34, at a center of the receiving cavity 34 is formed a retaining structure 35, and four fingergrip cavities 36 are provided around the peripheral sidewall of the receiving cavity 34. Adjacent to each corner of the recess 31 is formed a projecting column 37, and the projecting column 37 and the positioning portions 32 extend in different directions, the end surface of the respective projecting columns 37 and the bottom surface of the respective fingergrip cavities 36 are bonded to the inner surface of the foldable board 20, and thus the tray 30 is bonded with the foldable board 20.

Figure 4:
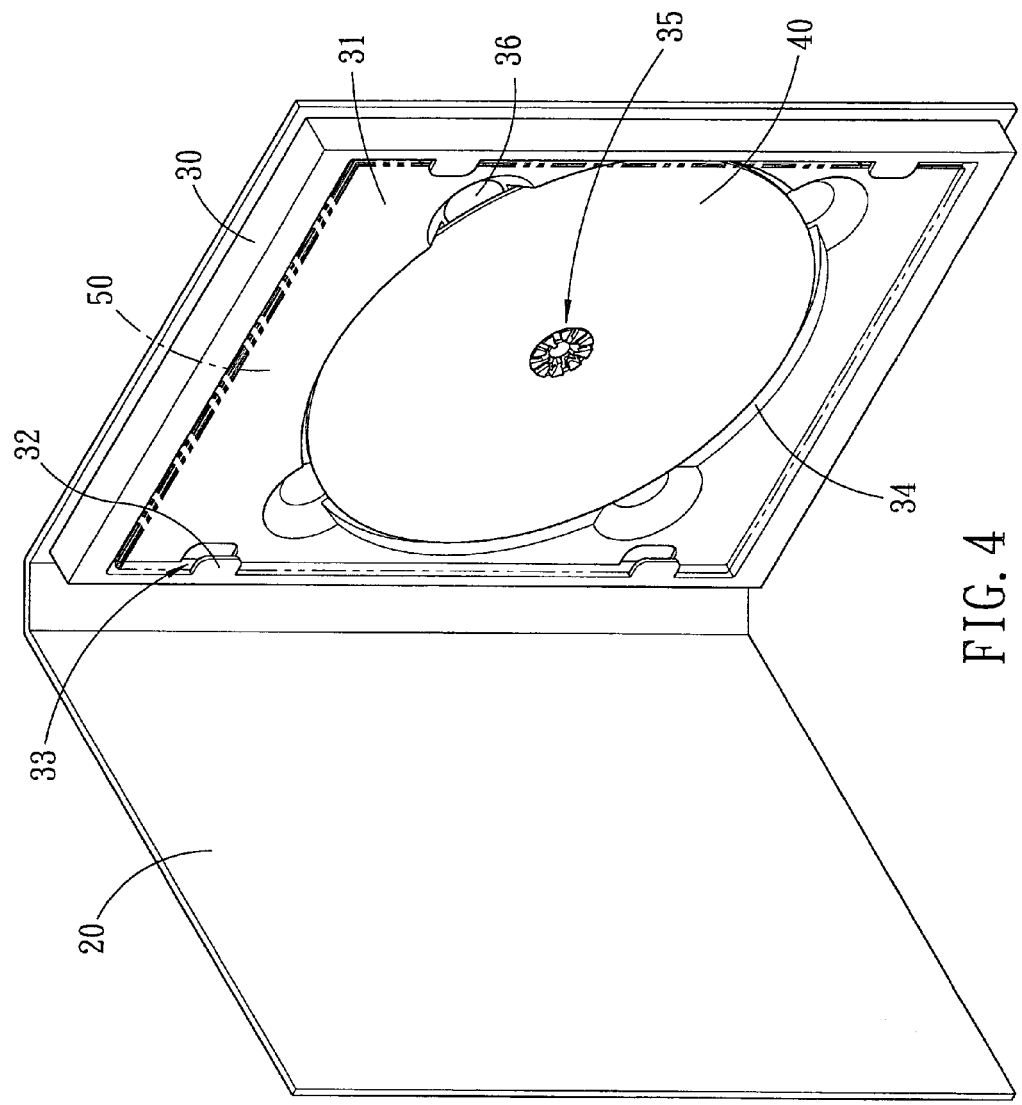
FIG. 4 is an operational view of a storage container for an appendage of a compact disc in accordance with the present invention.

For a better understanding of the present invention, its function and operation, reference should be made to FIGS. 3 and 4, the recess 31 is formed in the tray 30 before the receiving cavity 34 is shaped, so that the CD 40 can be retained on the retaining structure 35 at the bottom of the receiving cavity 34. Furthermore, at two opposite sides of the recess 31 are arranged positioning portions 32, and a space 33 is defined between the positioning portion 32 and the bottom of the recess 31, so that an appendage 50 can be received in the recess 31 in such a manner that both sides of the appendage 50 are confined in the space 33 by the positioning portions 32.

Besides bonding the bottom surface of the fingergrip cavities 36 to the inner surface of the foldable board 20, the end surface of the respective projecting columns 37 is also bonded with the foldable board 20, and the projecting columns 37 are located close to the corners of the bottom of the tray 30, thus improving the connection between the tray 30 and the foldable board 20.

Since the tray 30 is a unitary plastic structure, the positioning portions 32 and the recess 31 can be made in a single molding process, therefore, the production cost is relatively saved.

Figure 5:
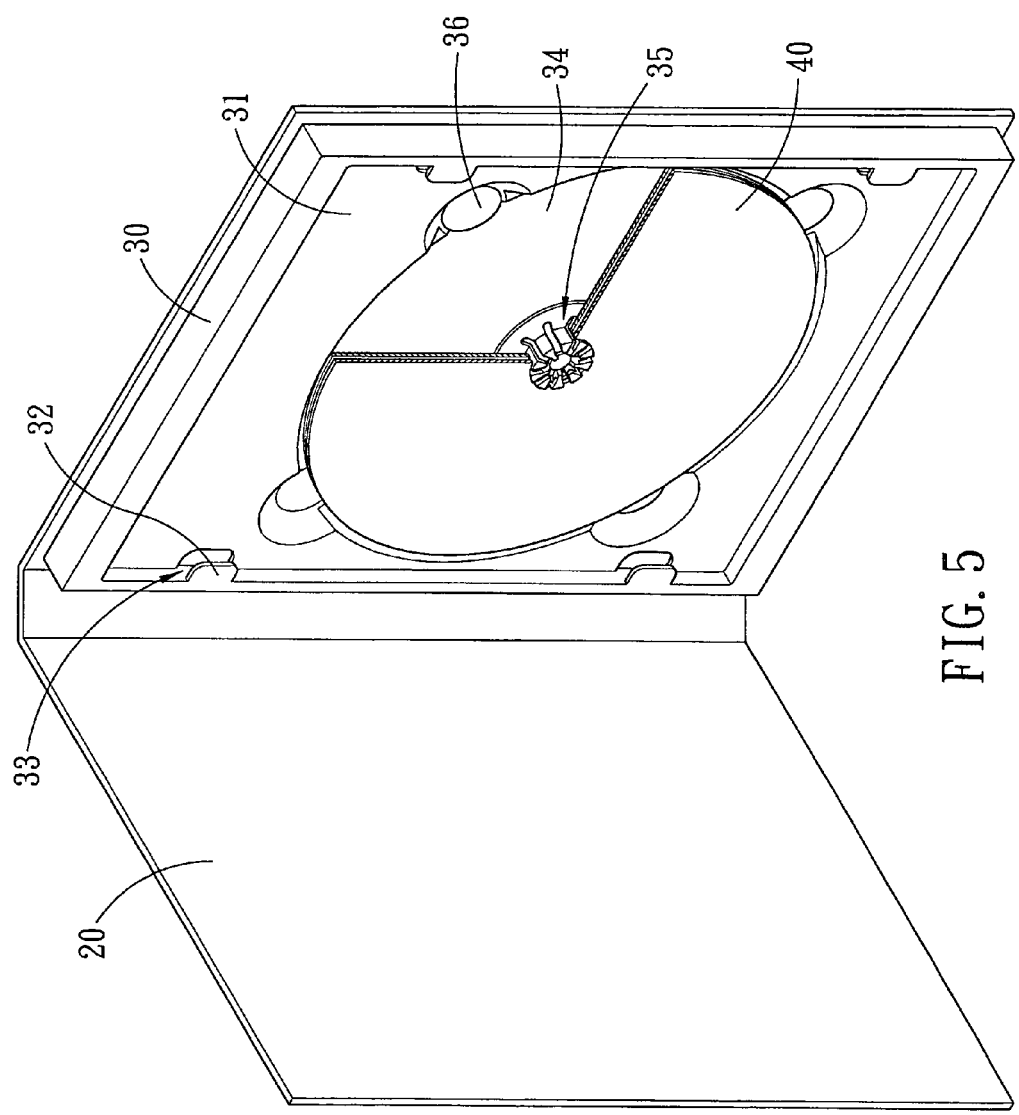
FIG. 5 is an operational view of a storage container for an appendage of a compact disc in accordance with the present invention, wherein several compact discs are loaded in the recess.
Figure 6:
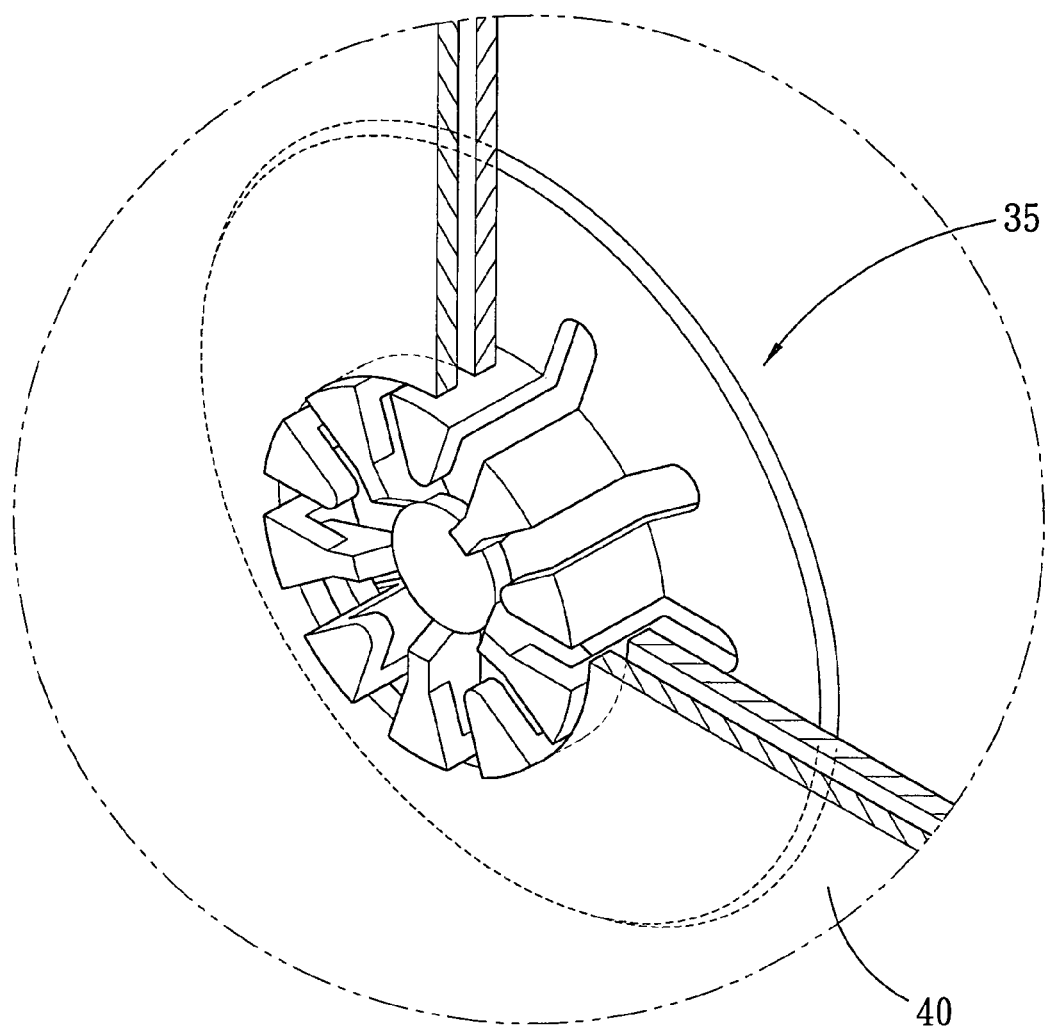
FIG. 6 is an enlarged view of a part of FIG. 5.

Besides being able to receive a single CD 40, the tray 30 can also be used to receive multiple CDs 40 simply by adjusting the depth of the receiving cavity 34 and the height of the retaining structure 35, and thus the appendage 50 still can be retained in the recess 31 by the positioning portions 32, as shown in FIGS. 5 and 6.

Figure 7:
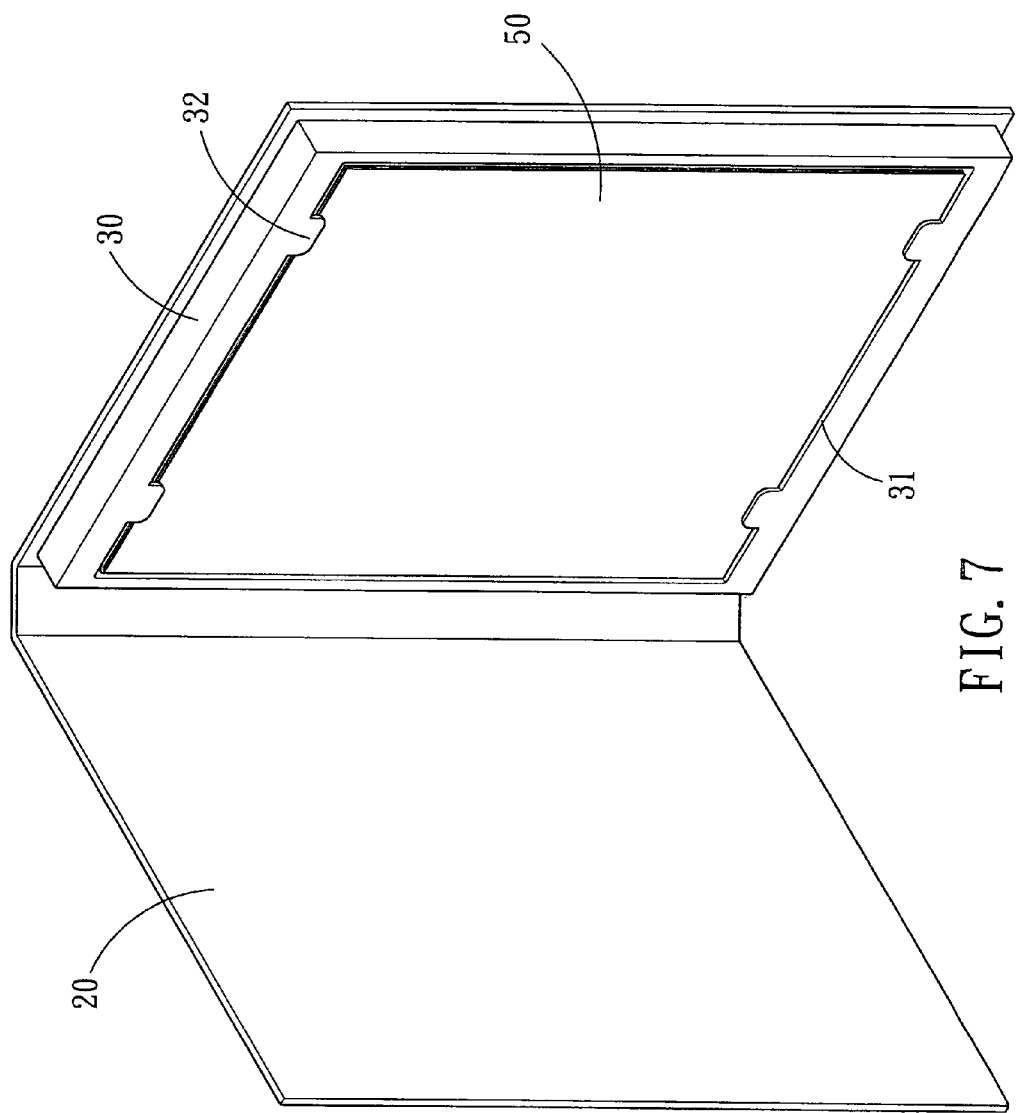
FIG. 7 shows a storage container for an appendage of a compact disc in accordance with another embodiment of the present invention.

Besides the positioning portions 32 at two opposite sides of the recess 31, it also can define another group of positioning portions 32 at another two opposite sides of the recess 31, as shown in FIG. 7, thus, the appendage 50 can be retained more firmly.

While we have shown and described various embodiments in accordance with the present invention, it should be clear to those skilled in the art that further embodiments may be made without departing from the scope of the present invention.

What is claimed is:

1. A storage container for an appendage of a compact disc comprising:
   a foldable board;
   a tray bonded to the foldable board, a recess formed on the tray, and a receiving cavity form at a bottom of the recess, at a bottom surface of the receiving cavity being formed a retaining structure for retaining compact disc;
   wherein
   a plurality of positioning portions are provided around peripheral sidewall of the recess, and a space is defined between the each of the positioning portions and the bottom surface of the recess, so that a appendage is received in the recess and are confined in the space by the positioning portions;
   wherein a plurality of projecting columns are located below the tray, each of the projecting columns and the positioning portions extend in different directions, and an end surface of each of the projecting columns is bonded to with the foldable board.

2. The storage container for an appendage of a compact disc as claimed in claim 1, wherein the positioning portions are formed at opposite sides of the recess of the tray.

* * * * *